Patented Mar. 5, 1929.

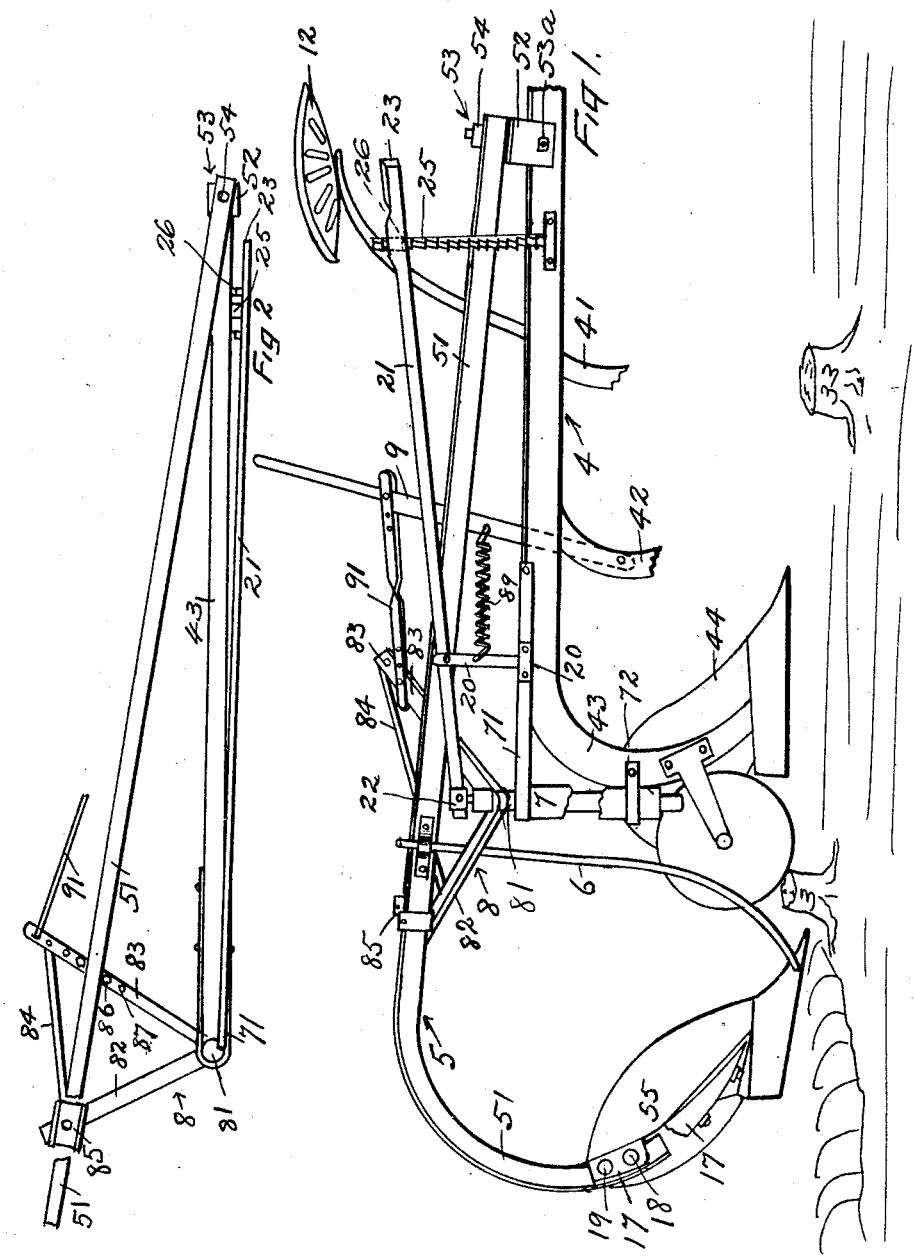

1,703,985

UNITED STATES PATENT OFFICE.

ERNEST VICTOR BRISCOE, OF KERMAN, AND GOTTLIEB BITTER, OF FRESNO, CALIFORNIA.

EARTHWORKING TOOL.

Application filed June 11, 1927. Serial No. 198,203.

Our invention relates to an earth working tool, and more particularly to an attachment for a gang plow which is adapted to be regulated at will, and independently of the gang plows to which it is attached. In plowing vineyards and orchards the gang plow commonly used is rigidly set to cut a strip of land of uniform width, each plow cutting a uniform width from the other, and as a result it is impossible to move the plow or any separate section thereof so that the soil can be stirred between the trees of vines in the row. Heretofore it has been the practice to use a gang plow to work the soil as close to the vines as practical, and then to single plow the vines with a small one horse plow so that the operator can guide the plow to avoid coming in contact with the vines and trees, and to guide it between the vines and trees in the row so that the soil will be stirred or turned over between the vines in the row.

Our invention relates to an auxiliary plow which is swiveled to a gang plow so that an operator can perform the functions of the single plow above referred to with said auxiliary plow and while the gang plow is stirring the soil between the rows. Other objects will be hereinafter disclosed.

These objects are accomplished by means of the device hereinafter described and illustrated in the accompanying drawing in which Fig. 1 is a side view of the plow. Fig. 2 is a top view of the plow with parts cut away and adapted to show the means for guiding the auxiliary plow in and out of the row, indicating the character of work accomplished.

In said figures we have represented the gang plow assembly as 4. The gang plow shown in the drawing consists of three beams, 41, 42, 43. These beams are uniformly and rigidlly spaced apart and are of such length that the plow on beam 41 runs ahead of the plow on the central beam 42, and the plow on beam 42 runs ahead of the plow 44 on the rear beam 43. In the drawing plows are shown which throw the ground toward the left, although the spirit of our invention covers right hand plows as well as plows of the character shown in the drawing.

The auxiliary plow assembly indicated as 5 consists of a beam 51 which should be constructed longer than the rear beam 43. Beam 51 is attached to beam 43 near the front end thereof by a swivel 53. This swivel consists of a U-member 52 pivoted to beam 43 in such relation that it can rock with bolt 53ª as its axis. Beam 51 is attached to the top of the U-member by one bolt 54 passing vertically through the top of the U-member and through the beam, thus permitting a horizontal movement of beam 51 about the bolt 54 as the center. Beam 51 is shaped so that the end opposite to the end which is attached to beam 43 curves downward and toward the right. The plow 55 attached to beam 51 points toward the right of the plow and by means of the swivel hereinbefore referred to, said plow can be swung to the right beyond the cutting edge of the plow 44 or in the opposite direction. For the purpose of automatically preventing the point from engaging a stump or a tree, a guide rod 6 is attached to the beam 51 and extends adjacent to the point of the plow 55, the object being that when the plow approaches a tree or a vine within a predetermined distance, the guide 6 will engage the tree, and the dragging of the guide along the side of the tree in the forward movement of the plow assembly will force the auxiliary plow to the left so that the point of the auxiliary plow cannot engage the stump or tree. As a matter of additional precaution in avoiding injury to vines which may be projecting under the guide rod, the auxiliary plow point is attached to the plow beam by a pivotal connection consisting of a point support 17 which is rigidly attached to the plow point and share. The support 17 is pivoted with a strong pivot 18 to the lower end of beam 51 so that the point of the plow can be swung forward and back. In the forward position it is held by a wooden or light metal pin 19. The pin 19 should be weak enough to break or cut if the pressure on the plow point is abnormal, which permits the plow to assume a position of the point dragging behind.

For the purpose of moving the plow to the right and to the left, we have placed a socket 7 at the rear of beam 43. This socket should be positioned preferably vertically. We have found it convenient to position the socket by means of supporting bracket 71 at the top and strap 72 at the bottom, which are adapted to hold the socket rigidly in the position desired.

A guiding assembly 8 consists of a post 81 which is positioned within the socket 7 so that it can have a swivel movement and an up and down sliding movement. To post 81 we have attached arms 82 and 83 on approximately the same horizontal plane. For the purpose of strengthening these arms a tie 84 extends from the outside end of arm 83 to the outside end of arm 82. On the top of arm 82 we have swiveled a U-member, or yoke 85 which is adapted to receive the beam 51. A lever 9 is pivoted at the lower end to plow beam 42, and between the ends thereof is pivoted a strap 91 which extends from the lever 9 to arm 83. By this assembly of levers, straps and arms it will be noted that by pulling the lever forward or pushing it backward, the post 81 will turn within socket 7 which will move the arm 82 radially on a horizontal plane, and thereby move the beam 51 on a horizontal plane either to the right or to the left. By this means the plow 55 can be moved toward the right so that it will cut a wide strip of land, or toward the left when it will cut less. By this means of adjustment the plow can be guided to cut the soil between the vines 3 and 33. When it approaches a vine by moving the lever 9 so that the plow is swung away from the vine, it will avoid contact with the vine.

For the purpose of regulating the depth of the plow, we have positioned a vertical post 20 on the beam 43, which post functions as a fulcrum for lever 21 which is pivoted at one end to post 81 with pivot 22, the other end of the lever, to-wit 23, being adapted to move up and down so that the assembly 8 is thereby raised or lowered. By raising or lowering assembly 8 the plow 55 is likewise raised or lowered.

For the purpose of holding the vertical adjustment of the auxiliary plow in the position desired, we have placed a ratchet bar 25 at the front end of beam 43 and on lever 21 we have positioned a dog 26 which engages with the ratchet 25. 12 is a seat which is located on the main plow beam 42 so that the operator of the auxiliary plow 55 can be seated thereon.

This auxiliary plow can be adapted for working automatically by placing a stop 86 in one of the adjusting holes 87 in arm 83, this stop being adapted to limit the movement of the beam 51 toward the right. The beam is yieldingly held in the cutting position by means of a spring 89 which is anchored at one end to the post 20 and at the other end to the lever 9. The function of this combination is that when the plow is set to cut the land between the vines in the row and there is no obstruction to prevent the plow from working the soil the full width set, the auxiliary plow will cut said width, and when the guide 6 engages a vine or stump the spring 89 permits the plow to be pushed toward the left and away from the vine. When the vine or other obstruction is passed, the auxiliary plow reengages the soil for the full width for which it is set, by the pull of said spring 89.

Having described our invention we claim as new and ask for Letters Patent:

1. In combination with a gang plow having a horizontal beam, an auxiliary earth working tool having a beam pivoted at one end thereof to the gang plow beam with a hinge adapted to permit the beam of the auxiliary plow to have a vertical and horizontal movement, means for adjusting the vertical and horizontal positions of the auxiliary tool consisting of a tubular socket attached to the gang plow beam a spaced distance from the hinge, a cylindrical post adapted to slide vertically within the socket and to rotate therein, a horizontal arm attached to the post, said arm having a yoke thereon at the end opposite the post, said yoke being adapted for the auxiliary plow beam to slide therein, means for raising and lowering the post in said socket consisting of a lever pivoted at one end to the post, and pivotally connected intermediate the ends to a fulcrum, and means for swinging the arm on its hinge consisting of a lever pivoted at one end to the main plow beam and a link connecting said lever between the ends thereof with the arm.

2. In combination with a main plow having a horizontal beam, an auxiliary plow having a beam pivotally hinged at the front end thereof to the beam of the main plow, means for guiding the auxiliary plow consisting of an arm pivoted to the main plow beam a spaced distance from the pivotal hinge, said arm having a yoke at the end opposite to the pivotal hinge adapted to hold and support the beam of the auxiliary plow, and adapted for the auxiliary plow beam to slide therein, a lever pivoted at one end to the main plow, and a rod connecting the lever and extended arm.

3. In combination with a main plow having a horizontal beam, an auxiliary plow having a beam, the front end of the beam being hinged to the main plow beam, and adapted to have a vertical swinging movement, means for vertical adjustment of the combined auxiliary plow and beam consisting of a member having a vertical socket attached to the main plow beam a spaced distance from the hinge of the auxiliary plow beam, a post adapted to slide vertically within the socket, an arm attached to the post adapted to support and hold the auxiliary plow beam, a lever pivoted at one end to the post, and pivoted to a fulcrum between the ends thereof, means for locking the lever at any position within its range of movement.

ERNEST VICTOR BRISCOE.
GOTTLIEB BITTER.